(12) United States Patent
Kawaguchi et al.

(10) Patent No.: US 12,117,045 B2
(45) Date of Patent: Oct. 15, 2024

(54) SEALED ROLLING BEARING

(71) Applicant: NTN CORPORATION, Osaka (JP)

(72) Inventors: Hayato Kawaguchi, Shizuoka (JP); Takahiro Wakuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 111 days.

(21) Appl. No.: 17/912,360

(22) PCT Filed: Mar. 19, 2021

(86) PCT No.: PCT/JP2021/011340
§ 371 (c)(1),
(2) Date: Sep. 16, 2022

(87) PCT Pub. No.: WO2021/193419
PCT Pub. Date: Sep. 30, 2021

(65) Prior Publication Data
US 2023/0137648 A1 May 4, 2023

(30) Foreign Application Priority Data
Mar. 24, 2020 (JP) .................. 2020-052562

(51) Int. Cl.
*F16C 33/78* (2006.01)
*F16C 19/06* (2006.01)
*F16C 33/80* (2006.01)

(52) U.S. Cl.
CPC ............ *F16C 33/782* (2013.01); *F16C 19/06* (2013.01); *F16C 33/7823* (2013.01); *F16C 33/805* (2013.01)

(58) Field of Classification Search
CPC .... F16C 19/06; F16C 33/782; F16C 33/7823; F16C 33/7826; F16C 33/7896; F16C 33/80; F16C 33/805
See application file for complete search history.

(56) References Cited

U.S. PATENT DOCUMENTS 5,028,054 A * 7/1991 Peach .................. F16J 15/3264
384/480
5,074,408 A * 12/1991 Smith .................. F16C 13/022
384/465

(Continued)

FOREIGN PATENT DOCUMENTS

| GB | 793407 | 6/1956 |
|---|---|---|
| JP | 49-124444 | 2/1948 |

(Continued)

OTHER PUBLICATIONS

Machine Translation of JP-H02121625-U (Year: 1990).*

(Continued)

*Primary Examiner* — Alan B Waits
(74) *Attorney, Agent, or Firm* — Wenderoth, Lind & Ponack, L.L.P.

(57) ABSTRACT

A sealed rolling bearing includes slingers and seal members disposed between an inner ring and an outer ring, and sealing a rolling element installation area. The radially inner and outer portions of each slinger are bent axially inwardly such that a labyrinth portion is defined between the radially outer bent portion of the slinger and the radially inner surface of the outer ring, the labyrinth portion having a path length, in the axial direction of the bearing, longer than the material thickness of the slinger.

9 Claims, 2 Drawing Sheets

(56) References Cited

U.S. PATENT DOCUMENTS

| | | | | |
|---|---|---|---|---|
| 5,722,664 | A | * | 3/1998 | Otto .................... F16C 33/7879 |
| | | | | 277/559 |
| 2009/0220182 | A1 | * | 9/2009 | Furukawa ............. F16C 19/386 |
| | | | | 384/543 |
| 2019/0010989 | A1 | * | 1/2019 | Falaschi .............. F16C 33/7853 |

FOREIGN PATENT DOCUMENTS

| | | | | | |
|---|---|---|---|---|---|
| JP | 2-121625 | | | 10/1990 | |
| JP | H02121625 | U | * | 10/1990 | |
| JP | 4-50724 | | | 4/1992 | |
| JP | 2002-213465 | | | 7/2002 | |
| JP | 2006266451 | A | * | 10/2006 | .......... F16C 33/7863 |
| JP | 2008-64238 | | | 3/2008 | |
| JP | 2009204142 | A | * | 9/2009 | ........... F16C 33/7859 |
| JP | 2009287596 | A | * | 12/2009 | .......... F16C 33/7853 |
| JP | 2013-145018 | | | 7/2013 | |
| JP | 2013-242033 | | | 12/2013 | |

OTHER PUBLICATIONS

Machine Translation of JP-2006266451-A (Year: 2006).*
Machine Translation of JP-2009204142-A (Year: 2009).*
Machine Translation of JP-2009287596-A (Year: 2009).*
English language translation of International Search Report issued May 25, 2021 in corresponding International (PCT) Patent Application No. PCT/JP2021/011340.
English language translation of International Preliminary Report on Patentability issued Sep. 22, 2022 in corresponding International (PCT) Patent Application No. PCT/JP2021/011340.

* cited by examiner

SEALED ROLLING BEARING

TECHNICAL FIELD

The present invention relates to a sealed rolling bearing used, e.g., as a deep groove ball bearing for an automotive engine accessory pulley.

BACKGROUND ART

In the markets of, e.g., emerging countries where road conditions and climates are severe for automobiles, automobiles are used in extremely severe environments, such as environments where automobiles have to travel while being partially submerged in water, or their engine compartments are washed at high pressure.

Therefore, high sealing performance is required for bearings for engine accessory pulleys, as mentioned above. As bearings that meet this requirement, sealed rolling bearings are disclosed in, e.g., Japanese Unexamined Patent Application Publication No. 2013-145018 (hereinafter the JP '018 reference) and Japanese Unexamined Utility Model Application Publication No. H04-50724 (hereinafter the JP '724 reference).

The sealed rolling bearing (sealing device for a rolling bearing) of the JP '018 reference is a bearing of which the outer ring is rotatable. This bearing includes, between the inner and outer rings, seal members sealing the rolling element installation space. Outside the respective seal members, slingers sized to lie within the width range of the bearing, are supported by the inner ring. The slingers prevent external splashed muddy water from entering the bearing.

Each seal member includes, on the outer side surface thereof, a side lip inclined in a direction in which the distance between the side lip and the outer ring narrows toward the distal end (protruding end) of the side lip, so as to define a labyrinth portion that hinders the inflow of, e.g., muddy water, between the distal end of the seal lip and the inner side surface of the slinger, thereby improving sealing performance.

The sealed rolling bearing (sealing device for a rolling bearing) of the JP '724 reference includes, as with the bearing of the JP '018 reference, both seal members and slingers. However, this bearing is different from the bearing of the JP '018 reference in that two seal members are disposed on each side, instead of providing a labyrinth portion.

PROBLEMS TO BE SOLVED BY THE INVENTION

In the bearing of the JP '018 reference, the radially outer end (edge) of each slinger is opposed to the radially inner surface of the outer ring. However, with this arrangement, since the gap between the radially outer edge of each slinger and the outer ring (this gap acts as an entry path for entry of, e.g., muddy water) has only a length (path length), in the direction of the center axis of the bearing, corresponding to the material thickness of the slinger, there is a limit to improving sealing performance.

In order to overcome this problem, in the bearing of the JP '018 reference, a side lip is disposed on each seal lip such that a labyrinth portion is defined between the side lip and the slinger, thereby increasing the number of entry hindering portions through which, e.g., muddy water does not pass easily.

However, since only a single labyrinth portion is defined between the side lip of each seal member and the slinger, e.g., muddy water that has flowed into the bearing through the gap between the slinger and the outer ring could enter the portion inside the slinger through the labyrinth portion, and stay in the space between the slinger and the seal member, and then could infiltrate into the installation space of the rolling elements through the sealed portion sealed by the seal member. Thus, this arrangement does not provide reliable sealing.

Since the bearing of the JP '724 reference uses two seal members on each side of the bearing, it is considered that this bearing provides better sealing performance than the bearing of the JP '018 reference. However, since two seal members are used, the number of bearing components increases, and the bearing width also increases inevitably. Thus, it is impossible to meet the requirements of reducing a rise in the bearing cost and reducing the size of the bearing.

For the bearing of the JP '018 reference, since the side lip on the outer side surface of each seal member is inclined in a direction in which the distance between the side lip and the outer ring narrows toward the distal end of the side lip, demolding is difficult after forming the seal member in a mold using rubber. Also, the moldability of the seal member is not good.

SUMMARY OF THE INVENTION

It is an object of the present invention to provide a sealed rolling bearing (i) which includes, between each slinger and the outer ring, entry hindering portions that make the inflow of, e.g., muddy water more difficult than in conventional bearings; (ii) in which the number of bearing components does not increase; and (iii) of which the bearing width does not increase.

In order to achieve the above object, the present invention provides a sealed rolling bearing comprising: two seal members (seals or shields) disposed between an inner ring and an outer ring, each on either side of a rolling element installation area of the bearing, so as to seal the rolling element installation area, and two slingers each disposed outside of a respective one of the two seal members, and sized to lie within a width range of the bearing, the slingers being supported by the inner ring, and preventing, e.g., external splashed muddy water from entering the bearing, wherein the sealed rolling bearing is improved in that each of the slingers includes: a radially inner bent portion formed by inwardly bending a radially inner side of the slinger, and press-fitted to an outer periphery of the inner ring; and a radially outer bent portion formed by inwardly bending a radially outer side of the slinger such that a labyrinth portion is defined between the radially outer bent portion and a radially inner surface of the outer ring, the labyrinth portion having a path length, in an axial direction of the bearing, longer than a material thickness of the slinger.

Preferred modes of the above sealed rolling are enumerated below.

Mode (1): The seal members are rubber seals each reinforced by a metal core, and including at least one side lip disposed on an outer side surface of the rubber seal, and protruding in the axial direction of the bearing, the at least one side lip having a distal end located inwardly of the radially outer bent portion of the slinger such that a labyrinth portion is defined between the at least one side lip and an inner side surface of a body of the slinger.

Mode (2): The at least one side lip of each of the seal members includes demolding tapers, the demolding tapers being such that a radially outer surface and a radially inner surface of the at least one side lip are inclined in opposite directions to each other, relative to respective reference lines parallel to a center axis of the bearing.

Mode (3): The at least one side lip of each of the seal members comprises a plurality of side lips radially displaced from each other.

Mode (4): The slingers are formed by pressing.

Mode (5): The slingers are formed of a cold-rolled material.

In the sealed rolling bearing of the present invention, since, by inwardly bending the radially outer portion of each slinger, a labyrinth portion whose path length in the axial direction of the bearing is longer than the material thickness of the slinger is defined between the radially outer bent portion and the radially inner surface of the outer ring, the flow resistance of e.g., muddy water at the labyrinth portion is larger than in the above-described bearing of the JP '018 reference.

Also, by making the distal end of the radially outer bent portion of each slinger located close to a respective one of annular protrusion formed on the radially inner surface of the outer ring (protrusion for defining a seal fitting groove), it is possible to define a labyrinth portion having a path area smaller than that of the labyrinth portion between the radially outer bent portion of the slinger and the radially inner surface of the outer ring. These improve sealing performance.

Only a single seal member is required on each side of the bearing, and thus the number of bearing components does not increase. By mounting only a single seal member to each side of the bearing, it is possible to reduce the width of the bearing, and thus to reduce the size of the bearing compared to the bearing of the JP '724 reference.

In the sealed rolling bearing of the above mode (1), the at least one side lip on each rubber seal is located inwardly of the radially outer bent portion of the slinger such that a meandering entry path for entry of, e.g., muddy water from outside is defined. The meandering shape further increases the path length of the entry path, and also complicates the flow of, e.g., muddy water entering the entry path, thus further increasing sealing performance.

For the above mode (3), in which a plurality of side lips are disposed on each seal member, it is possible to increase the number of entry (e.g., muddy water-entry) hindering portions, and thus to further increase sealing performance.

Also, for the above mode (2), in which the at least one side lip of each seal member includes demolding tapers, it is possible to smoothly separate the mold, and thus to easily form the seal member by injection molding.

Also, by using the slingers of the above mode (4) or (5), it is possible to increase the productivity of slingers, and thus to avoid a rise in the manufacturing cost.

DETAILED DESCRIPTION OF THE INVENTION

A sealed rolling bearing embodying the present invention is described below with reference to FIGS. 1 and 2.

Figure 1:
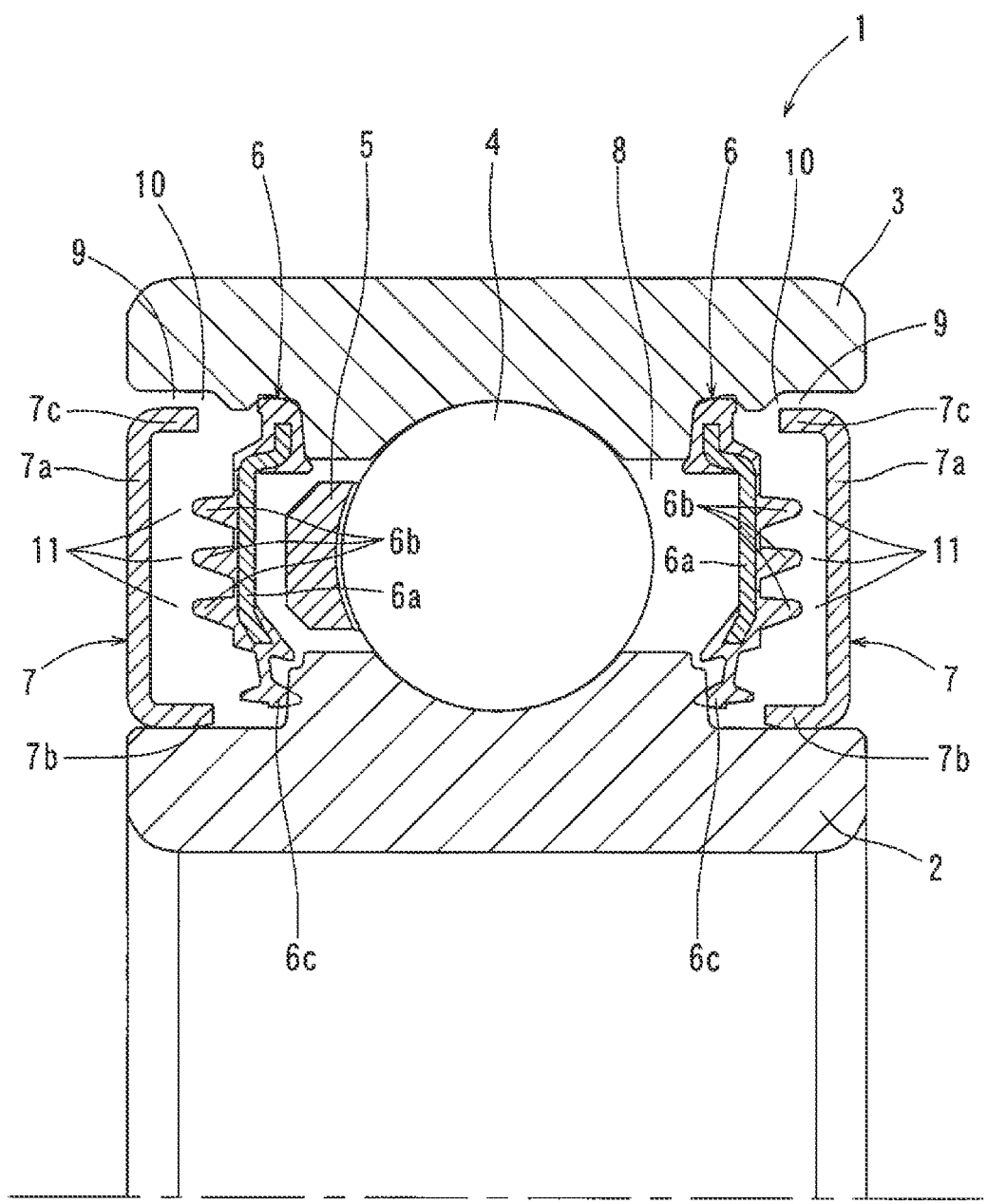
FIG. 1 is a sectional view of a portion of a sealed rolling bearing according to the present invention.

As illustrated in FIG. 1, the sealed rolling bearing 1 shown is a deep groove ball bearing of which both sides are sealed, and which is constituted by the combination of an inner ring 2; an outer ring 3; rolling elements 4 disposed between the inner and outer rings; a cage 5 retaining the rolling elements 4; two seal members 6; and two slingers 7.

The two seal members 6 are disposed with one on each side of a rolling element installation area 8 between the inner ring 2 and the outer ring 3. The seal members 6 shown are rubber seals each including a metal core 6a for reinforcement, and being mounted to the outer ring 3, which is rotatable. Circumferentially continuously extending side lips 6b protrude from the outer side surface of the rubber seal, in the axial direction of the bearing.

While the seal members 6 shown each has a plurality of side lips 6b radially displaced from each other, the number of the side lips 6b on the seal member is not particularly limited.

The slingers 7 are disposed outside of the respective seal members 6. The slingers 7 shown are formed by pressing a cold-rolled material, and each includes a body 7a having a flat plate shape. The radially inner and outer sides of the slinger 7 are inwardly bent, respectively, from the inner and outer edges of the body 7a, to extend toward the rolling element installation area 8, thus forming a radially inner bent portion 7b and a radially outer bent portion 7c, respectively.

The radially inner bent portion 7b and the radially outer bent portion 7c are straight portions having a circular annular shape, and extending parallel to the center axis of the bearing. Each slinger 7 is retained by the inner ring 2, which is fixed, with the radially inner bent portion 7b press-fitted to the outer periphery of the inner ring 2.

On the other hand, the radially outer bent portion 7c is located as close as possible to the radially inner surface of the outer ring 3, so as to define a first labyrinth portion 9 whose path length in the axial direction of the bearing is longer than the material thickness t of the slinger 7 (see FIG. 2), between the radially inner surface of the outer ring 3 and the radially outer surface of the radially outer bent portion 7c (additional second labyrinth portion 11 and third labyrinth portion 10 to be discussed below).

Further, the distal end of the radially outer bent portion 7c is located as close as possible to a respective one of two annular protrusions 3a formed on the radially inner surface of the outer ring 3, so as to define a third labyrinth portion 10 having a path area (cross-sectional size) smaller than that of the first labyrinth portion 9, between the annular protrusion 3a and the distal end of the radially outer bent portion 7c.

The annular protrusions 3a are formed for the purpose of defining, in the radially inner periphery of the outer ring 3, seal fitting grooves 3b for supporting the proximal ends of the respective seal members 6.

The side lips 6b of each seal member 6 each have its distal edge portion which has dimension B (see FIG. 2) located radially inwardly of the radially outer bent portion 7c of the slinger 7, thereby also defining second labyrinth portions 11 between the body 7a of the slinger 7 and the distal edges of the respective side lips 6b.

By making the distal edge portions of the side lips 6b located inwardly of the end of the radially outer bent portion 7c of the slinger 7, the seal lips 6b and the radially outer bent portion 7c overlap with each other by dimension B. This causes meandering of the path through which, e.g., muddy water could enter from outside (i.e. the path extending from the third labyrinth portion 10 to the portion of a main lip 6c of each seal member 6 in sliding contact with the inner ring 2). The meandering shape increases the path length of the entry path, and also complicates the flow of, e.g., muddy water entering the entry path.

Also, the second labyrinth portions 11 between the body 7a of each slinger 7 and the respective side lips 6b add to the number of entry hindering portions, thus further improving sealing performance.

Figure 2:
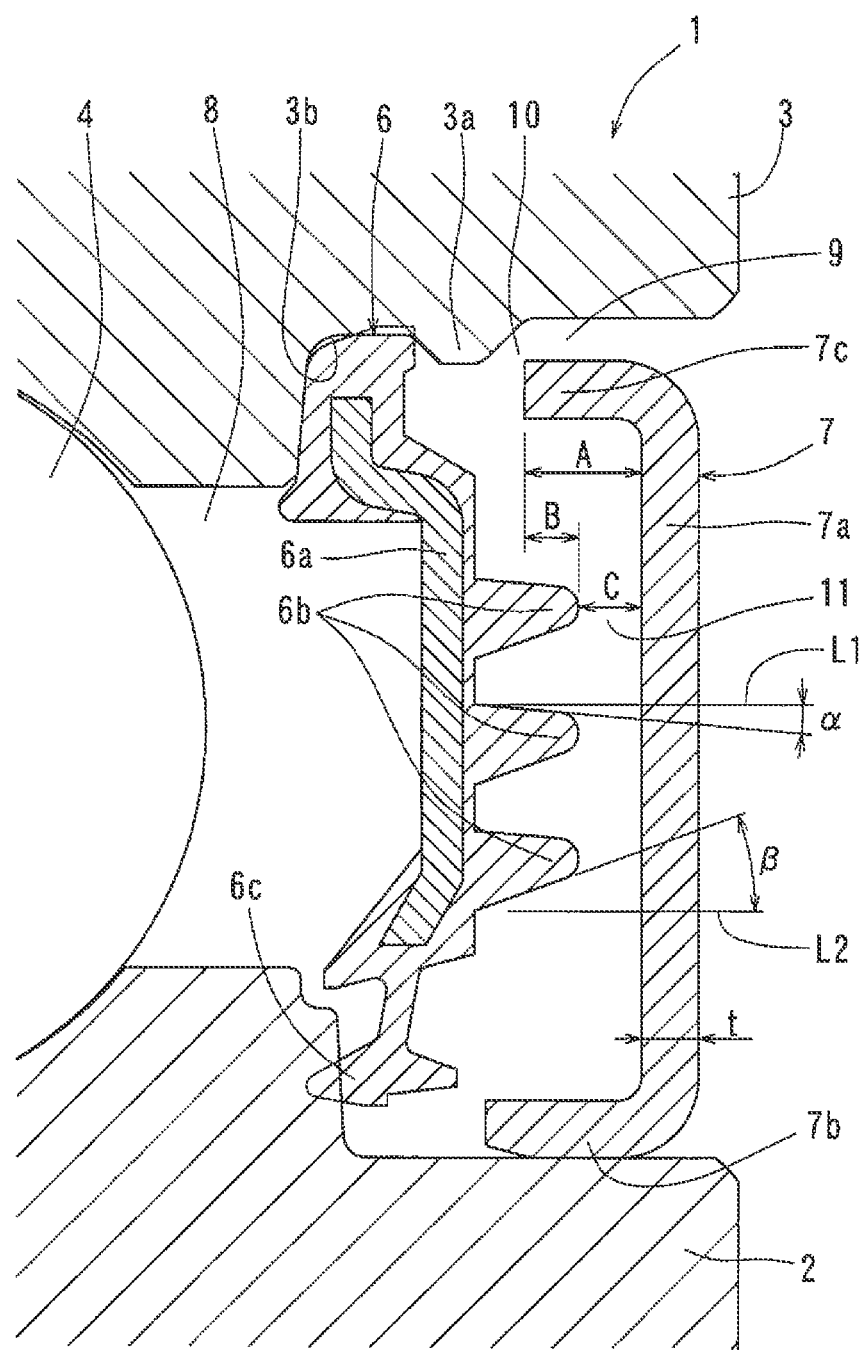
FIG. 2 is an enlarged sectional view illustrating the positional relationship between side lips on each seal member and a slinger in the sealed rolling bearing of FIG. 1.

The path widths C of the second labyrinth portions 11 in FIG. 2 are set to C=(A−B), where A is the dimension of the radially outer bent portion 7c of the slinger 7 in the axial direction of the bearing. The path width C of the second labyrinth portion 11 are exaggeratedly large as shown. In order to reduce a rise in the rotation torque caused by the contact of the side lips 6b of each seal member 6 with the body 7a of the slinger, the path widths C are set to C≥0 in view of gaps inside of the bearing, and assembling errors, thereby preventing the side lips 6b from coming into contact with the body 7a.

Each side lip 6b of each seal member 6 is preferably provided with demolding tapers α and β as illustrated in FIG. 2. The demolding tapers α and β are, respectively, the inclination angle of the radially outer surface of the side lip 6b relative to a reference line L1 parallel to the center axis of the bearing, and the inclination angle of the radially inner surface of the side lip 6b relative to a reference line L2 parallel to the center axis of the bearing. The demolding tapers α and β are such that the radially outer and inner surfaces of each side lip 6b are inclined in opposite directions to each other.

In order to reduce the speed at which, e.g., muddy water flowing down onto the radially outer surface of the side lip flows down on this surface, the inclination angle (taper α) of the radially outer surface is preferably smaller than the inclination angle (taper β) of the radially inner surface. The taper α is preferably 5 degrees or less.

The taper β is preferably set to 15 degrees or more and 20 degrees or less. By setting the taper β within this range, e.g., muddy water flowing on the radially outer surface of the side lip 6b and reaching the distal end thereof flows on the root side of the side lip 6b along the radially inner surface thereof, thus reducing the amount of muddy water dripping down directly from the distal end of the side lip 6b. In addition, by setting the taper β at such a large value, muddy water that has once entered the space between the seal member 6 and the slinger 7 can be discharged easily by a centrifugal force.

By providing the demolding tapers, the seal members 6, which are rubber seals, can be smoothly removed from the mold after being formed by injection molding, and thus can be easily manufactured.

As in the shown example, a plurality of side lips 6b are preferably disposed on each seal member 6, or a rubber seal, so as to be radially displaced from each other.

The larger the number of the side lips 6, the larger the number of the entry hindering portions, thus improving sealing performance more effectively.

While the seal members 6 shown are rubber seals, shields made of hard resin or metal which are used in shielded bearings may be used instead, as the seal members 6.

DESCRIPTION OF REFERENCE NUMERALS

1: Sealed rolling bearing
2: Inner ring
3: Outer ring
3a: Annular protrusion
3b: Seal fitting groove
4: Rolling element
5: Cage
6: Seal member
6a: Metal core
6b: Side lip
6c: Main lip
7: Slinger
7a: Body
7b: Radially inner bent portion
7c: Radially outer bent portion
8: Rolling element installation area
9, 10, 11: Labyrinth portions
A: Dimension, in the axial direction of the bearing, of the radially outer bent portion of the slinger
B: Dimension of the distal end portion of the side lip that is located radially inwardly of the radially outer bent portion of the slinger
C: Path width of the labyrinth portion between the distal end of the side lip and the body of the slinger
t: Material thickness t of the slinger
α, β: Demolding taper
L1, L2: Reference line of the demolding taper

The invention claimed is:

1. A sealed rolling bearing comprising:
two seal members disposed between an inner ring and an outer ring, each of the two seal members being located on a respective side of a rolling element installation area of the bearing, se as to seal the rolling element installation area, and
two slingers each disposed outside of a respective one of the two seal members, and sized to lie within a width range of the bearing, the two slingers being supported by the inner ring, and configured to prevent external splashed muddy water from entering the bearing,
wherein each of the two slingers includes:
a radially inner bent portion formed by axially inwardly bending a radially inner side of the slinger, the radially inner bent portion being press-fitted to an outer periphery of the inner ring; and
a radially outer bent portion formed by axially inwardly bending a radially outer side of the slinger such that a first labyrinth portion is defined between the radially outer bent portion and a radially inner surface of the outer ring, the first labyrinth portion having a path length, in an axial direction of the bearing, longer than a material thickness of the slinger,
wherein each of the two seal members is a rubber seal reinforced by a metal core, each of the two seal members having a side lip on an axially outer side surface of the rubber seal and protruding in the axial direction of the bearing, the side lip having a distal end located radially inwardly of the radially outer bent portion of a respective one of the two slingers such that a second labyrinth portion is defined between the side lip and an axially inner side surface of a body of the respective one of the two slingers,
wherein the side lip of each of the two seal members has a radially outer surface and a radially inner surface inclined in opposite directions to each other relative to respective reference lines parallel to a center axis of the bearing so as to be tapered toward the distal end of the at least one side lip, the radially outer surface of the side lip of each of the two seal members having an inclination angle smaller than an inclination angle of the radially inner surface of the side lip of each of the two seal members.

2. The sealed rolling bearing according to claim 1, wherein the at side lip of each of the two seal members comprises a first side lip of a plurality of side lips of each of the two seal members, the plurality of side lips of each of the two seal members being radially displaced from each other.

3. The sealed rolling bearing according to claim 2, wherein the two slingers are formed by pressing.

4. The sealed rolling bearing according to claim 3, wherein the two slingers are formed of a cold-rolled material.

5. The sealed rolling bearing according to claim 2, wherein the two slingers are formed of a cold-rolled material.

6. The sealed rolling bearing according to claim 1, wherein the two slingers are formed by pressing.

7. The sealed rolling bearing according to claim 6, wherein the two slingers are formed of a cold-rolled material.

8. The sealed rolling bearing according to claim 1, wherein the two slingers are formed of a cold-rolled material.

9. The sealed rolling bearing according to claim 1, wherein a distal end of the radially outer bent portion of each of the two slingers is configured to be located closer to the radially inner surface of the outer ring than is a remainder of the radially outer bent portion of each of the two slingers so as to form a third labyrinth portion having a path cross-sectional size smaller than a path cross-sectional size of the first labyrinth portion.

* * * * *